(12) United States Patent
Rotole

(10) Patent No.: US 11,375,663 B2
(45) Date of Patent: Jul. 5, 2022

(54) GROUND CONTOUR SENSING SYSTEM FOR CROP MOWING HEAD

(71) Applicant: DEERE & COMPANY, Moline, IL (US)

(72) Inventor: David V. Rotole, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 570 days.

(21) Appl. No.: 16/276,948

(22) Filed: Feb. 15, 2019

(65) Prior Publication Data
US 2020/0260638 A1 Aug. 20, 2020

(51) Int. Cl.
*A01D 34/00* (2006.01)
*A01D 34/28* (2006.01)
(Continued)

(52) U.S. Cl.
CPC ......... *A01D 41/141* (2013.01); *A01D 34/006* (2013.01); *A01D 34/008* (2013.01);
(Continued)

(58) Field of Classification Search
CPC .... A01D 34/006; A01D 34/008; A01D 34/24; A01D 34/28; A01D 34/283;
(Continued)

(56) References Cited

U.S. PATENT DOCUMENTS 3,478,499 A * 11/1969 Van Der Lely ...... A01D 34/246
56/11.9
3,771,302 A 11/1973 Vogt
(Continued)

FOREIGN PATENT DOCUMENTS

DE 19539143 A1 4/1997
DE 19826976 A1 12/1999
(Continued)

OTHER PUBLICATIONS

European Search Report issued in counterpart application No. 20155710.5 dated Jun. 19, 2020 (08 pages).
(Continued)

*Primary Examiner* — Adam J Behrens
(74) *Attorney, Agent, or Firm* — Taft Stettinius & Hollister LLP; Stephen F. Rost

(57) ABSTRACT

A ground contour sensing system and method for a vehicle with a mowing head. The system includes a sensor system that measures a ground contour in front of the mowing head, and generates contour measurement signals; and a controller that determines whether to move the mowing head based on the contour measurement signals, and generates movement commands for the mowing head when it determines to move the mowing head. The mowing head can include tilt and lift cylinders, and the controller can determine whether to move the mowing head using the tilt or lift cylinders. The sensor system can include a pivot arm that moves in response to changes in the ground contour, and an angle sensor that measures an angle of the pivot arm. There can be one or more sensor systems positioned between the right and left sides of the mowing head.

17 Claims, 6 Drawing Sheets

(51) Int. Cl.
    *A01D 34/14*     (2006.01)
    *A01D 41/14*     (2006.01)
    *A01D 34/03*     (2006.01)
    *A01D 34/07*     (2006.01)
    *A01D 34/24*     (2006.01)

(52) U.S. Cl.
    CPC ........... *A01D 34/032* (2013.01); *A01D 34/07* (2013.01); *A01D 34/24* (2013.01); *A01D 41/145* (2013.01)

(58) Field of Classification Search
    CPC .... A01D 34/286; A01D 33/14; A01D 41/141; A01D 41/145
    See application file for complete search history.

(56) References Cited

U.S. PATENT DOCUMENTS

| | | | |
|---|---|---|---|
| 3,908,345 A * | 9/1975 | Oni | A01D 41/141 56/208 |
| 4,507,910 A | 4/1985 | Thornley et al. | |
| 4,594,840 A * | 6/1986 | D'Almeida | A01D 41/145 56/11.2 |
| 4,858,419 A | 8/1989 | Bernier | |
| 4,944,141 A * | 7/1990 | Orlando | A01D 41/145 56/10.2 E |
| 5,076,046 A * | 12/1991 | Schilling | A01D 45/008 56/327.1 |
| 5,794,421 A | 8/1998 | Maichle | |
| 5,930,988 A | 8/1999 | Hanson | |
| 5,995,895 A | 11/1999 | Watt et al. | |
| 6,070,673 A | 6/2000 | Wendte | |
| 6,128,574 A | 10/2000 | Diekhans | |
| 6,202,395 B1 * | 3/2001 | Gramm | A01D 41/141 |
| 6,421,994 B1 | 7/2002 | Boucher et al. | |
| 6,425,232 B1 | 7/2002 | Desnijder et al. | |
| 6,615,570 B2 | 9/2003 | Beck et al. | |
| 6,883,299 B1 * | 4/2005 | Gramm | A01D 41/06 172/4 |
| 6,955,034 B1 | 10/2005 | Blakeslee et al. | |
| 7,400,957 B2 | 7/2008 | Hofer et al. | |
| 7,430,846 B2 | 10/2008 | Bomleny et al. | |
| 7,874,132 B2 | 1/2011 | Sauerwein | |
| 9,585,309 B2 | 3/2017 | Posselius et al. | |
| 9,668,418 B2 | 6/2017 | Patton et al. | |
| 9,668,420 B2 | 6/2017 | Anderson et al. | |
| 9,980,431 B2 * | 5/2018 | Long | A01D 41/127 |
| 2003/0079456 A1 | 5/2003 | Mellin | |
| 2003/0188521 A1 | 10/2003 | Muller et al. | |
| 2004/0006958 A1 * | 1/2004 | Thiemann | A01D 41/141 56/10.2 R |
| 2004/0221562 A1 | 11/2004 | Snider | |
| 2005/0097874 A1 | 5/2005 | Priepke | |
| 2005/0126147 A1 | 6/2005 | Nickel et al. | |
| 2006/0123764 A1 | 6/2006 | McLean et al. | |
| 2006/0189326 A1 | 8/2006 | Black, Sr. et al. | |
| 2006/0277888 A1 | 12/2006 | Erdmann et al. | |
| 2009/0005990 A1 | 1/2009 | Anderson et al. | |
| 2009/0223192 A1 | 9/2009 | Engel | |
| 2009/0312920 A1 | 12/2009 | Boenig et al. | |
| 2010/0217474 A1 | 8/2010 | Baumgarten et al. | |
| 2010/0242427 A1 | 9/2010 | Anstey et al. | |
| 2012/0095654 A1 | 4/2012 | Miller et al. | |
| 2012/0185140 A1 | 7/2012 | Kormann et al. | |
| 2013/0086879 A1 | 4/2013 | Laumeier | |
| 2014/0041351 A1 | 2/2014 | Bollin et al. | |
| 2014/0083071 A1 | 3/2014 | Fay, II | |
| 2014/0096498 A1 | 4/2014 | Estock et al. | |
| 2014/0215984 A1 | 8/2014 | Bischoff | |
| 2014/0237981 A1 | 8/2014 | Roberge | |
| 2014/0302897 A1 | 10/2014 | Isaac et al. | |
| 2015/0253427 A1 | 9/2015 | Slichter et al. | |
| 2016/0066509 A1 | 3/2016 | Fay, II et al. | |
| 2017/0071132 A1 | 3/2017 | Dunn et al. | |
| 2017/0265390 A1 | 9/2017 | Panoushek et al. | |
| 2017/0280627 A1 | 10/2017 | Treffer et al. | |
| 2018/0035609 A1 | 2/2018 | Barbi | |
| 2018/0070531 A1 * | 3/2018 | Long | A01D 41/141 |
| 2018/0192587 A1 * | 7/2018 | Berggren | A01D 75/285 |
| 2018/0243771 A1 | 8/2018 | Davis et al. | |
| 2018/0257657 A1 | 9/2018 | Blank et al. | |
| 2018/0271016 A1 | 9/2018 | Milano et al. | |
| 2018/0317388 A1 | 11/2018 | Gresch et al. | |
| 2018/0325024 A1 | 11/2018 | Rotole et al. | |
| 2018/0325028 A1 | 11/2018 | Rotole et al. | |
| 2018/0325029 A1 | 11/2018 | Rotole et al. | |
| 2018/0325032 A1 | 11/2018 | Rotole et al. | |
| 2018/0329618 A1 | 11/2018 | Wieckhorst et al. | |
| 2018/0329620 A1 | 11/2018 | Cabrespine et al. | |
| 2019/0335661 A1 * | 11/2019 | Seiders, Jr. | A01D 41/141 |
| 2020/0000034 A1 * | 1/2020 | Schlipf | A01B 63/111 |
| 2020/0163277 A1 * | 5/2020 | Cooksey | A01D 41/127 |
| 2021/0195833 A1 * | 7/2021 | Hamilton | A01D 34/283 |

FOREIGN PATENT DOCUMENTS

| | | | |
|---|---|---|---|
| DE | 10030505 A1 | 1/2002 | |
| DE | 102007020801 A1 | 11/2008 | |
| DE | 102013110636 A1 | 3/2015 | |
| DK | 135799 B | 6/1977 | |
| EP | 0558436 A1 | 9/1993 | |
| EP | 1813142 A1 | 8/2007 | |
| EP | 2436259 A1 | 4/2012 | |
| EP | 2710875 A1 | 3/2014 | |
| EP | 2853143 A1 | 4/2015 | |
| EP | 2853146 A2 | 4/2015 | |
| EP | 2863729 B1 | 9/2016 | |
| EP | 3598886 A1 | 1/2020 | |
| NL | 1026257 C1 | 11/2005 | |
| RU | 99922 U1 | 12/2010 | |
| WO | WO2015148902 A1 | 10/2015 | |
| WO | WO-2018152266 A1 * | 8/2018 | ........... A01D 41/127 |
| WO | WO-2020101992 A1 * | 5/2020 | ........... A01D 41/145 |
| WO | WO-2020102199 A1 * | 5/2020 | ........... A01D 41/141 |

OTHER PUBLICATIONS

Glancy et al., A System for the Automatic Adjustment and Control of the Conditioning Roll Gap on Mower—Conditioners, SAE Technical Paper.

Massey Ferguson, Product Information Guide, Hay Tools Kits Guide, MF16-57PMB, May 2017, 112 pages (specific to pp. 30-34 for 9100 Series RazorBar Disc Headers).

* cited by examiner

GROUND CONTOUR SENSING SYSTEM FOR CROP MOWING HEAD

FIELD OF THE DISCLOSURE

The present disclosure relates to agricultural vehicles, and more particularly to ground contour sensing systems for crop mowing heads attached to agricultural vehicles.

BACKGROUND

Crop mowing heads for mowing hay and other crops can be damaged or dulled and/or can damage the crop being mowed by hitting or cutting into the ground hidden by the crop before the crop is cut or mowed. Crop density (lack of open spaces), roughness of terrain, and harshness of conditions in front of the hay mowing head make it difficult for ground contour sensing. Additional challenges for a ground contour sensing system on a crop mowing head can include avoidance of cutting too close (hairpinning or scalping the crop), avoidance of hitting the ground and damaging the head, and/or generating crop buildup on the mechanism. The current method is to employ a hydraulic float system that allows the mowing head, which can typically weigh around 6,000 pounds, to lightly float across the ground. However, float systems, whether mechanical or hydraulic, are limited in their range of operation, and their response times are delayed which can cause scalping of the crop and head wear, especially wear on the cutterbar. Float systems for crop mowing heads are currently only tied into the lift circuits of the head to control vertical downforce, but do not provide tilt control.

It would be desirable to have a ground contour sensing system for a crop mowing head that gives the head control system enough response time to provide accurate ground contour following that avoids scalping the crop or damaging the mowing head. It would also be desirable for the ground contour sensing system to tie into the tilt circuit, in addition to lift or float circuits, of the mowing head to provide control of the attitude of the mowing head as well as the height.

SUMMARY

A ground contour sensing system is disclosed for a vehicle with a mowing head that moves across the ground. The ground contour sensing system includes a first sensor system and a controller. The first sensor system measures a first ground contour of the ground in front of the mowing head, and generates first contour measurement signals. The controller receives the first contour measurement signals, determines whether to move the mowing head based on the first contour measurement signals, and generates and sends movement commands to the mowing head when it determines to move the mowing head based on the first contour measurement signals.

The mowing head can include a tilt cylinder that tilts the front of the mowing head relative to the rear of the mowing head, and the controller can determine whether to move the mowing head using the tilt cylinder based on the first contour measurement signals, and can generate and send movement commands to the tilt cylinder when it determines to move the mowing head using the tilt cylinder. The mowing head can also include a lift cylinder that raises and lowers the mowing head relative to the ground; and the controller can determine whether to move the mowing head using the lift cylinder based on the first contour measurement signals, and can generate and send movement commands to the lift cylinder when it determines to move the mowing head using the lift cylinder.

The first sensor system can include a pivot arm with a proximal end and a distal end, where the distal end moves in response to changes in the first ground contour in front of the mowing head, and where the first contour measurement signals are based on movement of the pivot arm. The first sensor system can also include an angle sensor coupled to the proximal end of the pivot arm, where the angle sensor measures an angle of the pivot arm, and where the first contour measurement signals are ground angle readings generated by the angle sensor. The first sensor system can also include a coulter blade coupled to the distal end of the pivot arm, where the coulter blade travels along the ground in front of the mowing head. Alternatively, the distal end of the pivot arm can travel along the ground in front of the mowing head. The first sensor system can also include a stop configured to prevent movement of the proximal end of the first pivot arm beyond the stop, and where the proximal end of the pivot arm is biased towards the stop. The first sensor system can also include a connection arm with a proximal end and a distal end, where the proximal end is coupled to the mowing head and the distal end is coupled to the angle sensor, and where the connection arm extends in front of the mowing head such that the angle sensor and the pivot arm are in front of the mowing head.

The mowing head can extend laterally between a right side and a left side. The first sensor system can be positioned near the center between the right and left sides of the mowing head. The first sensor system can be positioned near the left side of the mowing head; and the ground contour sensing system can also include a second sensor system that measures a second ground contour of the ground in front of the mowing head, and generates second contour measurement signals; where the second sensor system is positioned near the right side of the mowing head. The controller can be configured to receive the first and second contour measurement signals, to determine whether to move the mowing head based on the first and second contour measurement signals, and to generate and send movement commands to the mowing head when it determines to move the mowing head based on the first and second contour measurement signals.

The mowing head can include a tilt cylinder that tilts the front of the mowing head relative to the rear of the mowing head; a right lift cylinder that raises and lowers the right side of the mowing head relative to the left side of the mowing head; and a left lift cylinder that raises and lowers the left side of the mowing head relative to the right side of the mowing head. The controller can be configured to determine whether to move the mowing head using one or more of the tilt and left and right lift cylinders based on the first and second contour measurement signals, and to generate and send movement commands to the tilt and left and right lift cylinders when it determines to move the mowing head using the tilt and left and right lift cylinders. The controller can be configured to determine whether to move the mowing head using the tilt cylinder based on the first and second contour measurement signals, and to generate and send movement commands to the tilt cylinder when it determines to move the mowing head using the tilt cylinder based on the first and second contour measurement signals. The controller can configured to determine whether to move the mowing head using the left lift cylinder based on the first contour measurement signals, and to generate and send movement commands to the left lift cylinder when it determines to move the mowing head using the left lift cylinder; and to determine whether to move the mowing head using the right lift cylinder based on the second contour measurement signals, and to generate and send movement commands to the right lift cylinder when it determines to move the mowing head using the right lift cylinder.

The first sensor system can include a first pivot arm with a proximal end and a distal end, where the distal end moves in response to changes in the first ground contour in front of the mowing head, and where the first contour measurement signals are based on movement of the first pivot arm. The second sensor system can include a second pivot arm with a proximal end and a distal end, where the distal end moves in response to changes in the second ground contour in front of the mowing head, and where the second contour measurement signals are based on movement of the second pivot arm. The first sensor system can also include a first angle sensor coupled to the proximal end of the first pivot arm, where the first angle sensor measures an angle of the first pivot arm, and the first contour measurement signals are ground angle readings generated by the first angle sensor. The second sensor system can also include a second angle sensor coupled to the proximal end of the second pivot arm, where the second angle sensor measures an angle of the second pivot arm, and the second contour measurement signals are ground angle readings generated by the second angle sensor.

A ground contour sensing method is disclosed for a vehicle with a mowing head that moves across the ground. The ground contour sensing method includes detecting a ground contour of the ground in front of the mowing head using a sensor system, generating contour measurement signals based on the detected ground contour, determining whether to move the mowing head based on the contour measurement signals, and generating and sending movement commands to the mowing head when it is determined to move the mowing head based on the contour measurement signals. The mowing head can include a tilt cylinder that tilts the front of the mowing head relative to the rear of the mowing head, and a lift cylinder that raises and lowers the mowing head relative to the ground. Determining whether to move the mowing head based on the contour measurement signals can include determining whether the contour measurement signals are in a tilt adjustment region, and determining whether the contour measurement signals are in a lift adjustment region. Generating and sending movement commands to the mowing head can include generating and sending movement commands to the tilt cylinder when it is determined that the contour measurement signals are in the tilt adjustment region, and generating and sending movement commands to the lift cylinder when it is determined that the contour measurement signals are in the lift adjustment region.

The tilt cylinder can have an adjustment range. When it is determined that the contour measurement signals are in the lift adjustment region, the method can also include determining a desired tilt direction for the mowing head; determining whether the tilt cylinder can be further adjusted in the desired tilt direction; and generating and sending movement commands to the tilt cylinder to move in the desired tilt direction when it is determined that the tilt cylinder can be further adjusted in the desired tilt direction.

The sensor system can include a pivot arm and an angle sensor, where the pivot arm has a proximal end coupled to the angle sensor and a distal end that moves in response to changes in the ground contour in front of the mowing head. Detecting a ground contour of the ground in front of the mowing head can include measuring an angle of the pivot arm using the angle sensor, and generating contour measurement signals can include generating ground angle signals based on the measured angle of the pivot arm.

The ground contour sensing method can also include monitoring speed of the tractor; and generating movement commands based on the monitored speed of the tractor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
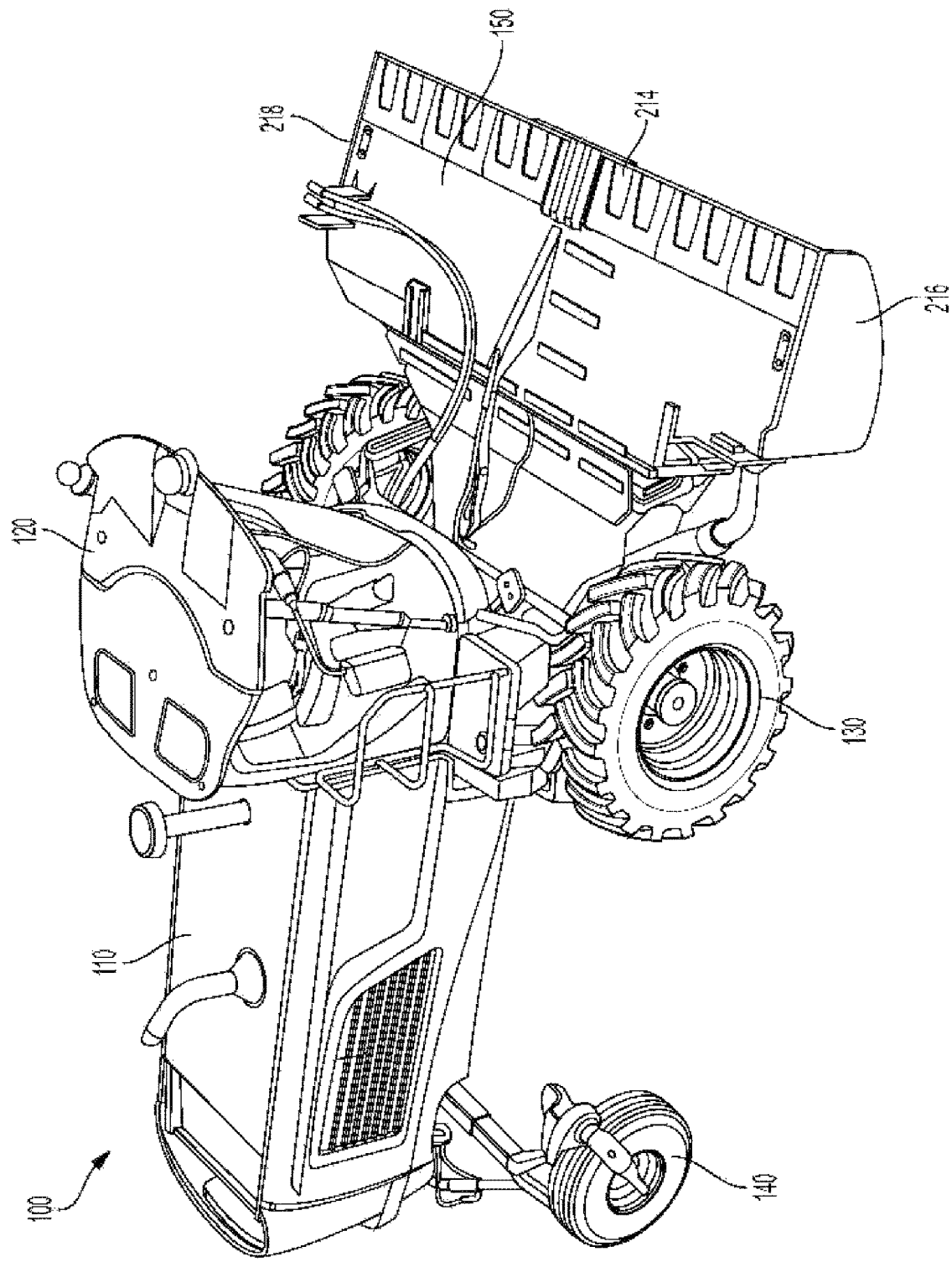
FIG. 1 illustrates an exemplary embodiment of a tractor that includes a crop mowing head.

FIG. 1 illustrates an exemplary embodiment of a tractor 100 that includes an engine compartment 110 that holds an engine, an operator cab 120, front wheels 130, rear wheels 140 and a crop mowing head 150. The exemplary tractor 100 shown in FIG. 1 is a windrower. The front and rear wheels 130, 140 support the tractor 100, including the engine compartment 110 and operator cab 120 above the ground. In alternative tractor embodiments, tracks can be used instead of wheels. The operator cab 120 includes controls for an operator to control the tractor 100, including the engine, wheels 130, 140 and the crop mowing head 150. The engine provides power to turn the wheels 130, 140 to propel the tractor 100. At least the front wheels 130 can be steerable to steer the tractor 100, and alternatively both the front and rear wheels 130, 140 can be steerable to steer the tractor 100. The operator cab 120 provides the operator with a clear view of the area being worked by the tractor 100 and crop mowing head 150.

Figure 2:
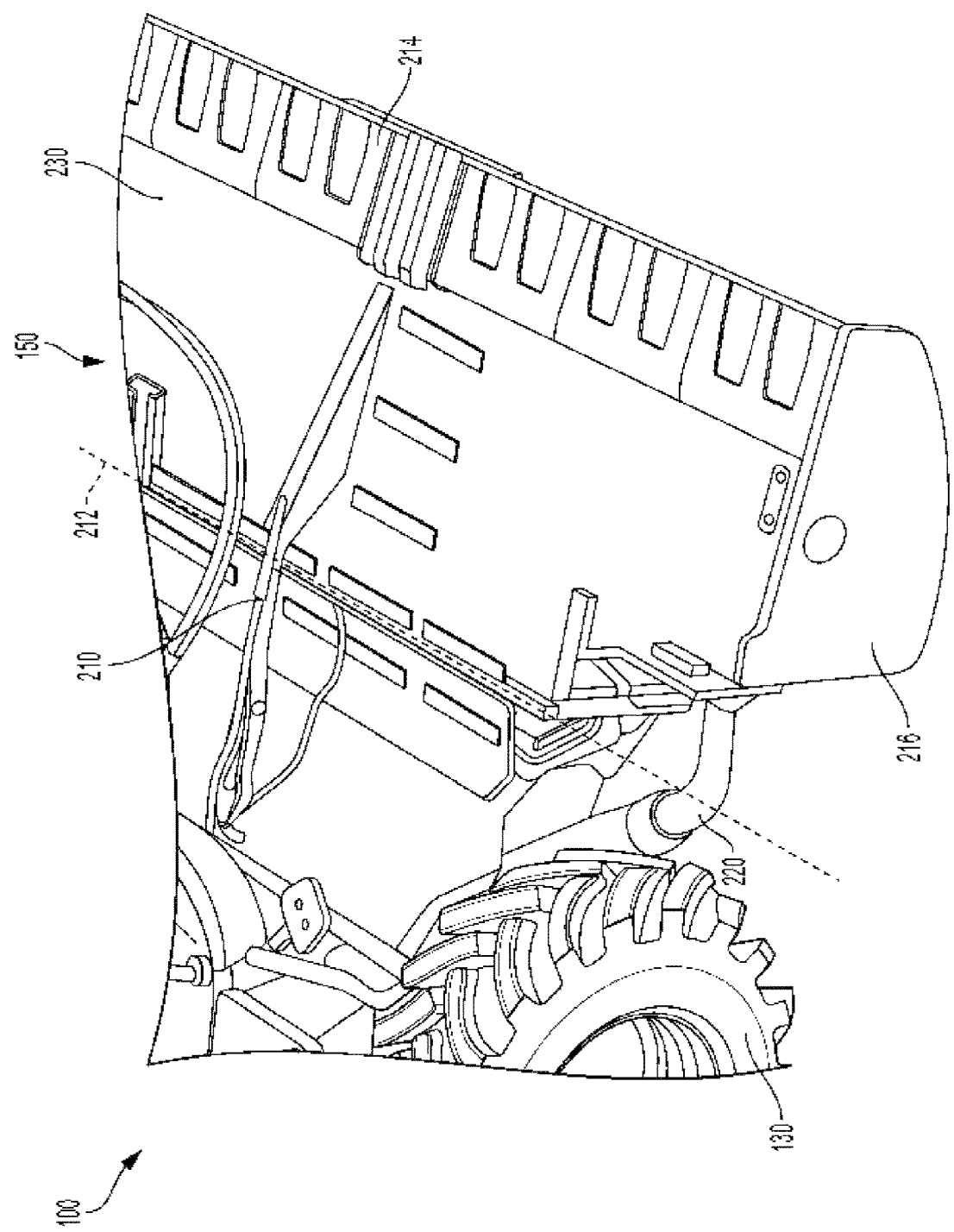
FIG. 2 illustrates a closer view of the crop mowing head.

The crop mowing head 150 is coupled to the front of the tractor 100. FIG. 2 illustrates a closer view of the crop mowing head 150. The crop mowing head 150 includes a tilt cylinder 210, a tilt axis 212, a float or lift cylinder 220 and a cover 230. The crop mowing head 150 has a front 214, a right side 216 and a left side 218. There are typically float and/or lift cylinders 220 on each side of the crop mowing head 150. The tilt cylinder 210 can tilt the crop mowing head 150 in the fore-aft direction about the tilt axis 212, which lifts or lowers the front 214 of the mowing head 150 relative to the tilt axis 212. The float or lift cylinder 220 can raise and lower the entire crop mowing head 150 vertically. With float or lift cylinders 220 at each of the right and left ends 214, 216 of the mowing head, the right end float or lift cylinder 220 can raise and lower the right end 214 relative to the left end 216 of the mowing head 150, and the left end float or lift cylinder 220 can raise and lower the left end 216 relative to the right end 214 of the mowing head 150, and both the left and right float or lift cylinders 220 can raise and lower the entire mowing head 150 vertically. The cover 230 covers the top of the crop mowing head 150.

Figure 3:
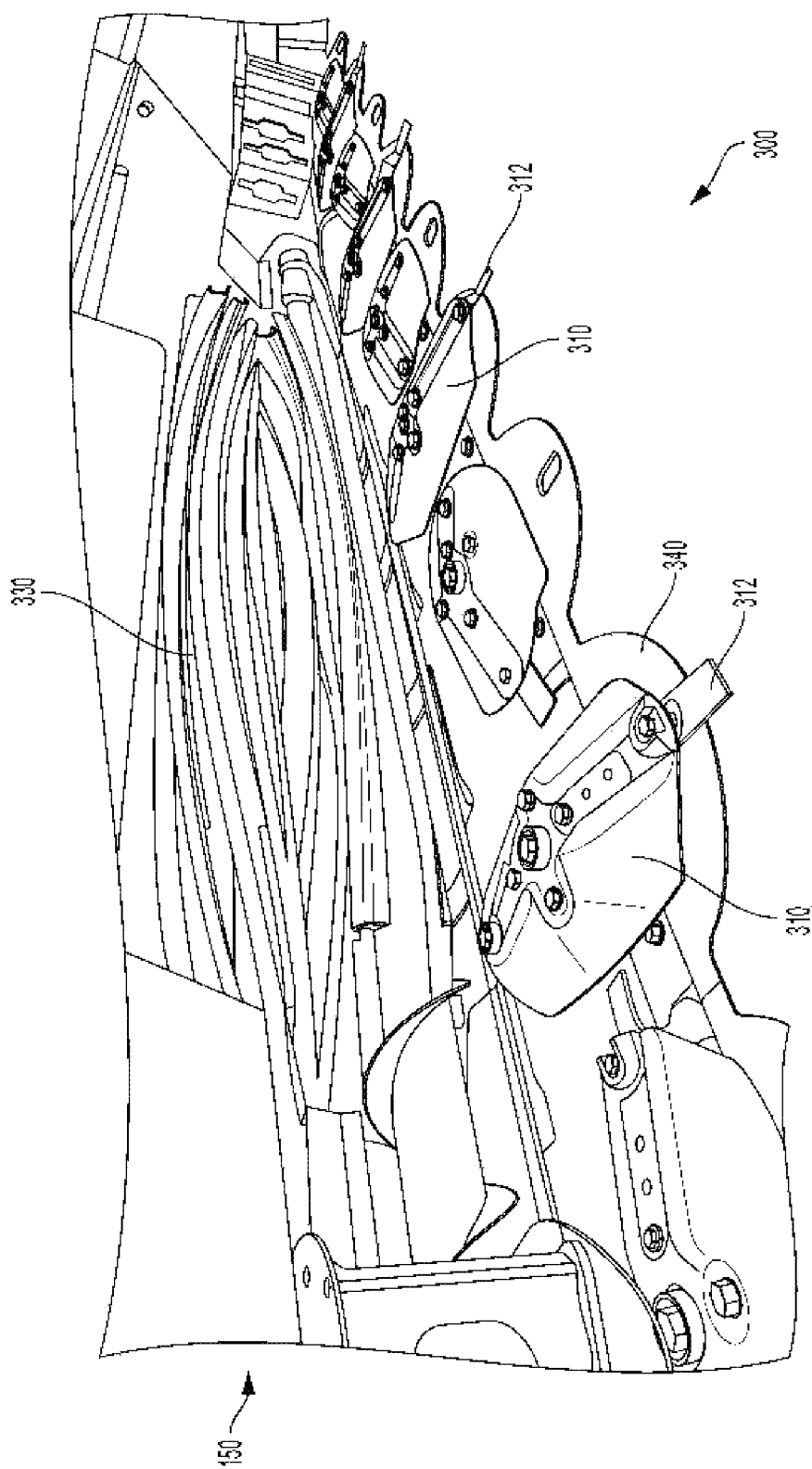
FIG. 3 illustrates a portion of the crop mowing head with the cover removed.

FIG. 3 illustrates a portion of the crop mowing head 150 with the cover 230 removed. The crop mowing head 150 includes a cutterbar 300, conditioning rollers 330 and a skid plate 340. The cutterbar 300 includes a plurality of rotating heads 310, and each of the rotating heads 310 includes at least one knife or blade 312.

When in the operating position, the majority of the weight of the mowing head 150 is supported by the tractor 100 and the remaining weight produces a downforce on the mowing head 150. During a cutting operation, the rotating heads 310 of the cutterbar 300 rotate rapidly and the blades 312 cut the crop at a cutting height leaving stubble at that height. The cut material passes through the conditioning rollers 330 which collect and condition the cut crop and lay it behind the mowing head 150. The crop mowing head 150 preferably floats just above the ground with the skid plate 340 positioned below the cutterbar 300, so the blades 312 cut the crop close to the ground and the skid plate 340 hits any mild roughness to help prevent the blades 312 from cutting into the ground. The operator can use the tilt cylinder 210 to angle the front 214 of the mowing head 150 up or down in a sloped area or rough terrain as needed to keep the blades 312 at a desired cutting height or height region above the ground, and to protect the mowing head 150 and blades 312 from hitting the ground and any debris. The operator can use the float and/or lift cylinders 220 to raise the mowing head 150 vertically in more severe terrain as desired to further protect the mowing head 150 and blades 312 from hitting the ground and any debris. The problem is that before the crop is cut, it can be challenging for an operator to know how severe the underlying terrain is that the mowing head is approaching.

Figure 4:
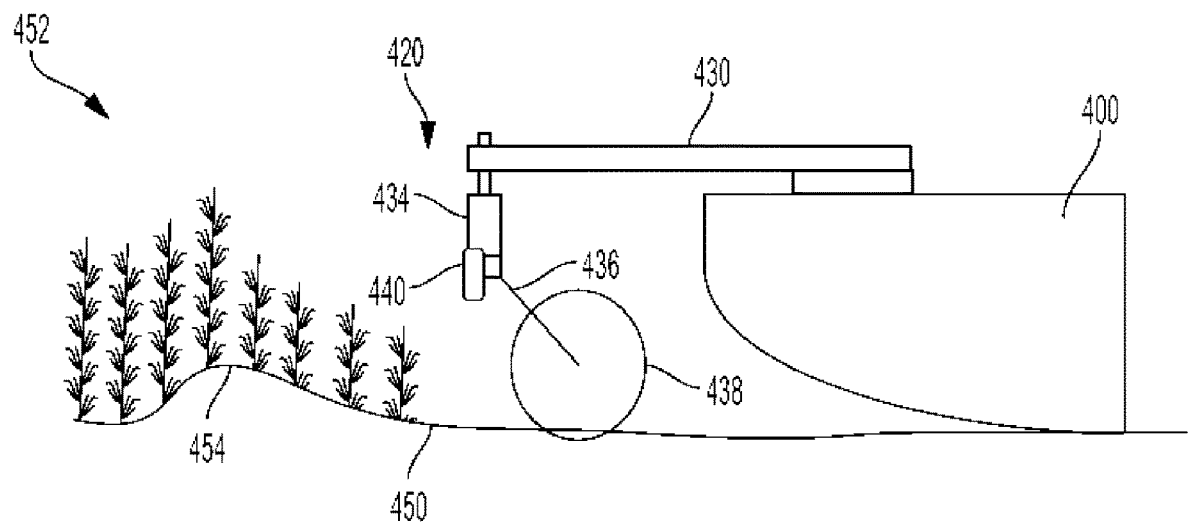
FIG. 4 illustrates an exemplary embodiment of a mowing head with a ground contour sensing system approaching a crop growing on the ground with a bump under the crop.

FIG. 4 illustrates an exemplary embodiment of a mowing head 400 with a ground contour sensing system 420 approaching a crop 452 growing on the ground 450 with a bump 454 under the crop 452. The ground contour sensing system 420 includes a connection arm 430, a ground angle sensor 434, a pivot arm 436, a coulter blade 438 and a stop 440. The proximal end of the connection arm 430 connects to the mowing head 400, and the distal end of the connection arm 430 connects to the ground angle sensor 434. The proximal end of the pivot arm 436 connects to the ground angle sensor 434, and the distal end of the pivot arm 436 connects to the coulter blade 438. The connection arm 430 extends in front of the mowing head 400 such that the ground angle sensor 434, pivot arm 436 and coulter blade 438 are in front of the mowing head 400, and the coulter blade 438 moves along the ground 450 in front of the mowing head 400. The coulter blade 438 can be thin (for example, ¹/₁₆ inch or less) to minimize crushing or pushing down of the crop before it is cut by the mowing head 400. The pivot arm 436 can be biased, for example by a spring, to push towards the stop 440 so that when the coulter blade 438 is lifted off the ground 450, the pivot arm 436 pushes against the stop 440. The stop 440 prevents the pivot arm 436 from moving in front of the stop 440, such that the pivot arm 436 remains between the stop 440 and the mowing head 400 even when the coulter blade 438 is not touching the ground 450.

As the coulter blade 438 moves along the ground 450, the ground angle sensor 434 monitors the angle of the pivot arm 436, and the ground contour sensing system 420 sends ground angle readings back to a controller of the tractor 100. The ground contour sensing system 420 can communicate with the controller by wireless or wired communication methods. There can be multiple occurrences of the ground contour sensing system 420 on the mowing head 400; for example, one sensing system 420 located near the center (between the left and right ends) of the mowing head 420, or sensing systems 420 located near each of the left and right ends of the mowing head 420, or sensing systems 420 located near each end and the middle of the mowing head 420, or various other arrangements.

Figure 6:
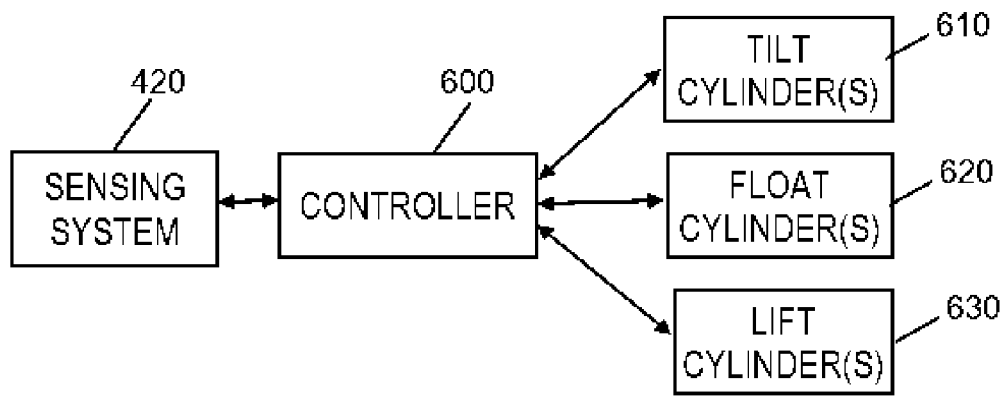
FIG. 6 illustrates a block diagram of a ground contour sensing system communicating with a tractor controller that has tilt, float and lift cylinders to move the mowing head.

FIG. 6 illustrates a block diagram of the ground contour sensing system 420 communicating with a controller 600 of a tractor that has one or more tilt cylinder(s) 610, float cylinder(s) 620 and lift cylinder(s) 630 to move the mowing head 400. In some instances, one set of cylinders can serve as both float and lift cylinders. Using the ground angle readings, the controller 600 can anticipate the contour of the upcoming ground 450 even when hidden by the crop 452 and the controller 600 can send commands to the tilt, float and lift cylinders 610, 620, 630 to move the mowing head 400 accordingly to help prevent damage or dulling of the blades 312 in the mowing head 400 by hitting the ground 450, and to try to keep the blades 312 of the mowing head 400 within a desired height region above the ground 450.

Figure 7:
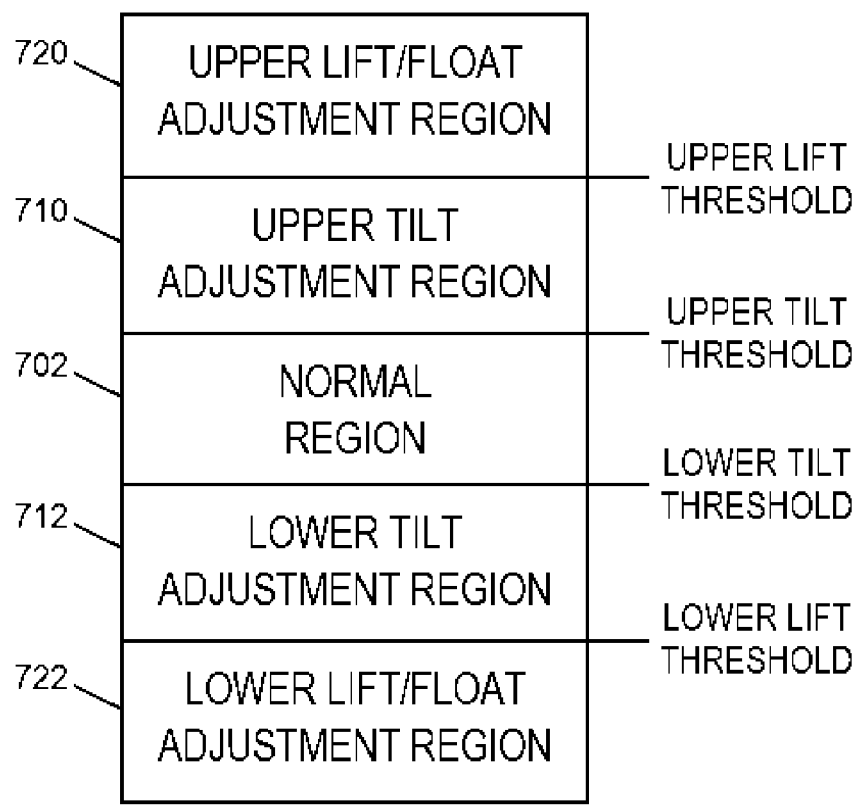
FIG. 7 illustrates an exemplary adjustment diagram for a ground contour sensing system.

FIG. 7 illustrates an exemplary adjustment diagram for a ground contour sensing system 420. This example will be described with reference to FIGS. 4 and 6, and assuming increasing ground angle readings indicate an upward change in ground contour and decreasing ground angle readings indicate a downward change in ground contour. The opposite could be the case as would be understood by those of ordinary skill in the art.

If the ground angle readings stay within a normal region 702, indicating fairly smooth, flat ground then no adjustment of the tilt, float or lift cylinders 610, 620, 630 is required. When the ground angle readings go above an upper tilt threshold, the ground contour sensing system 420 enters an upper tilt adjustment region 710 where the tilt cylinders 610 are activated to increase the angle of the mowing head 400 to try to avoid the blades of the mowing head 400 from hitting the ground. The tilt cylinders 610 typically have a tilt adjustment range, for example +/−10 degrees. If the ground angle readings continue to increase and go above an upper lift threshold, the ground contour sensing system 420 enters an upper lift/float adjustment region 720 where the lift and/or float cylinders 620, 630 are also activated to lift the mowing head 400 to try to avoid the blades of the mowing head 400 from hitting the ground. The tilt cylinders 610 can continue to be adjusted in the upper lift/float adjustment region 720 if the tilt cylinders have not yet reached the upper limit of their tilt adjustment range. When the ground angle readings start decreasing back down, the ground contour sensing system 420 lowers the mowing head 400 with the lift and/or float cylinders 620, 630. When the ground angle readings decrease back down below the upper lift threshold into the upper tilt adjustment region 710, the ground contour sensing system 420 also starts decreasing the tilt angle of the mowing head 400 with the tilt cylinders 610. When the ground angle readings decrease back down below the upper tilt threshold into the normal region 702, the ground contour sensing system 420 can continue to adjust the tilt, float and lift cylinders 610, 620, 630 back to their default settings for level mowing.

The ground contour sensing system 420 can act similarly to lower the mowing head 400 when the ground angle readings decrease below the normal region 702. When the ground angle readings go below a lower tilt threshold, the ground contour sensing system 420 enters a lower tilt adjustment region 712 where the tilt cylinders 610 are activated to decrease the angle of the mowing head 400 to try to keep the blades of the mowing head 400 within a desired height region above the ground. If the ground angle readings continue to decrease and go below a lower lift threshold, the ground contour sensing system 420 enters a lower lift/float adjustment region 722 where the lift and/or float cylinders 620, 630 are also activated to lower the mowing head 400 to try to keep the blades of the mowing head 400 within a desired height region above the ground. The tilt cylinders 610 can continue to be adjusted in the lower lift/float adjustment region 722 if the tilt cylinders have not yet reached the lower limit of their tilt adjustment range. When the ground angle readings start increasing back up, the ground contour sensing system 420 raises the mowing head 400 with the lift and/or float cylinders 620, 630. When the ground angle readings increase back above the lower lift threshold into the lower tilt adjustment region 712, the ground contour sensing system 420 also starts increasing the tilt angle of the mowing head 400 with the tilt cylinders 610. When the ground angle readings increase back above the lower tilt threshold into the normal region 702, the ground contour sensing system 420 can continue to adjust the tilt, float and lift cylinders 610, 620, 630 back to their default settings for level mowing.

The upper and lower thresholds can but do not have to have the same absolute value. As an example, but not for limitation, the upper and lower tilt thresholds can be +/−1 degree, respectively, and the upper and lower lift thresholds can be +/−10 degrees, respectively. The ground contour sensing system 420 can also take the speed of the vehicle and/or the reaction time of the hydraulic system and cylinders into account and adjust the tilt, float or lift cylinders 610, 620, 630 more rapidly and/or decrease the absolute values of the tilt and lift thresholds based on the vehicle speed.

In FIG. 4, as the coulter 438 moves along the ground 450 before reaching the bump 454, the angle sensor 434 monitors the angle of the pivot arm 436 and the ground angle readings remain fairly steady in a normal range indicating a relatively flat, smooth ground contour. When the coulter blade 438 reaches the bump 454, the pivot arm 436 would move back towards the mowing head 400 and the ground angle readings would change (increase or decrease) to indicate an upcoming bump or hill. Depending on the size and steepness of the upcoming bump or hill, the speed of the tractor and other factors the tilt, lift and float cylinders 610, 620, 630 can be activated to help prevent damage or dulling of the mowing head 400 and its blades, and to try to keep the blades 312 of the mowing head 400 within a desired height region above the ground 450.

The upper and lower tilt thresholds can be established at the upper and lower edges of a normal range 702, such that when the angle of the pivot arm 436 reaches one of the tilt thresholds, the tilt cylinder 610 is activated to start tilting the mowing head 400 in the appropriate direction to try to keep the blades 312 of the mowing head 400 within a desired height region above the ground 450. When the angle of the pivot arm 436 is greater than the upper tilt threshold and enters the upper tilt adjustment region 710, the tilt cylinder 610 can be activated to tilt up the front of the mowing head 400 by an amount that is a function of the difference between the angle of the pivot arm 436 and the upper tilt threshold. When the angle of the pivot arm 436 is less than the lower tilt threshold and enters the lower tilt adjustment region 712, the tilt cylinder 610 can be activated to tilt down the front of the mowing head 400 by an amount that is a function of the difference between the angle of the pivot arm 436 and the lower tilt threshold.

The upper and lower lift thresholds are established where the float/lift cylinders 620, 630 are also activated. The upper lift threshold is typically greater than the upper tilt threshold, the lower lift threshold is typically less than the lower tilt threshold, so the controller 600 would initially react to a ground contour change using the tilt cylinder 610 and if the contour change was more significant supplement movement using the float/lift cylinders 620, 630. When the angle of the pivot arm 436 reaches one of the lift thresholds, the float/lift cylinders 620, 630 are activated to start lifting/lowering the mowing head 400 in the appropriate direction to try to keep the blades 312 of the mowing head 400 within the desired height region above the ground 450. When the angle of the pivot arm 436 is greater than the upper lift threshold and enters the upper lift/float adjustment region 720, the float/lift cylinders 620, 630 can be activated to lift up the mowing head 400 by an amount that is a function of the difference between the angle of the pivot arm 436 and the upper lift threshold. When the angle of the pivot arm 436 is less than the lower lift threshold and enters the lower lift/float adjustment region 722, the float/lift cylinders 620, 630 can be activated to lower the mowing head 400 by an amount that is a function of the difference between the angle of the pivot arm 436 and the lower lift threshold. If the mowing head 400 has ground contour sensing systems 420 and float/lift cylinders 620, 630 on each side of the mowing head 400, then the float/lift cylinders 620, 630 on each side can be controlled independently based on the angle readings from the ground contour sensing systems 420 on its side of the mowing head 400.

Figure 5:
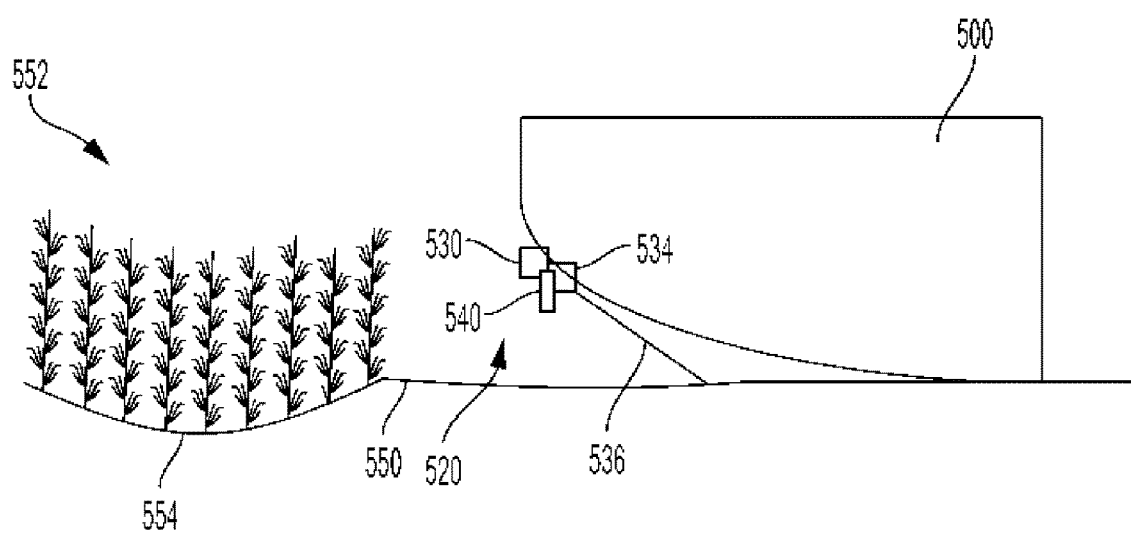
FIG. 5 illustrates an exemplary embodiment of a mowing head with an alternative ground contour sensing system approaching a crop growing on the ground with a gully under the crop.

FIG. 5 illustrates an exemplary embodiment of a mowing head 500 with an alternative embodiment of a ground contour sensing system 520 approaching a crop 552 growing on the ground 550 with a gully 554 under the crop 552. The ground contour sensing system 520 includes a connector 530, an angle sensor 534, a pivot arm 536 and a stop 540. The connector 530 connects the angle sensor 534 and the proximal end of the pivot arm 536 to the mowing head 500. The distal end of the pivot arm 536 touches and moves along the ground 550 in front of the mowing head 500. The pivot arm 536 can be thin (for example, $\frac{1}{32}$ inch or less) to minimize crushing or pushing down of the crop before it is cut by the mowing head 500. The pivot arm 536 can be biased, for example by a spring, to push towards the stop 540 so that when the pivot arm 536 is not touching the ground 550, the pivot arm 536 pushes against the stop 540. The stop 540 prevents the pivot arm 536 from moving in front of the stop 540, such that the pivot arm 536 remains between the stop 540 and the mowing head 500 even when the pivot arm 536 is not touching the ground 550.

As the pivot arm 536 moves along the ground 550, the angle sensor 534 monitors the angle of the pivot arm 536, and the ground contour sensing system 520 sends ground angle readings back to a controller of the tractor 100. The ground contour sensing system 520 can communicate with the controller by wireless or wired communication methods. There can be multiple occurrences of the ground contour sensing system 520 on the mowing head 500; for example, one sensing system 520 near the center of the mowing head 500, or sensing systems 520 located near each of the left and right ends of the mowing head 500, or sensing systems 520 located near each end and the middle of the mowing head 500, or various other arrangements. The normal angle range, upper and lower tilt thresholds, upper and lower lift thresholds and activation of the tilt, float and lift cylinders 610, 620, 630 as described with regard to the ground contour sensing system 420 can also apply to the alternative embodiment of the ground contour sensing system 520.

Figure 8:
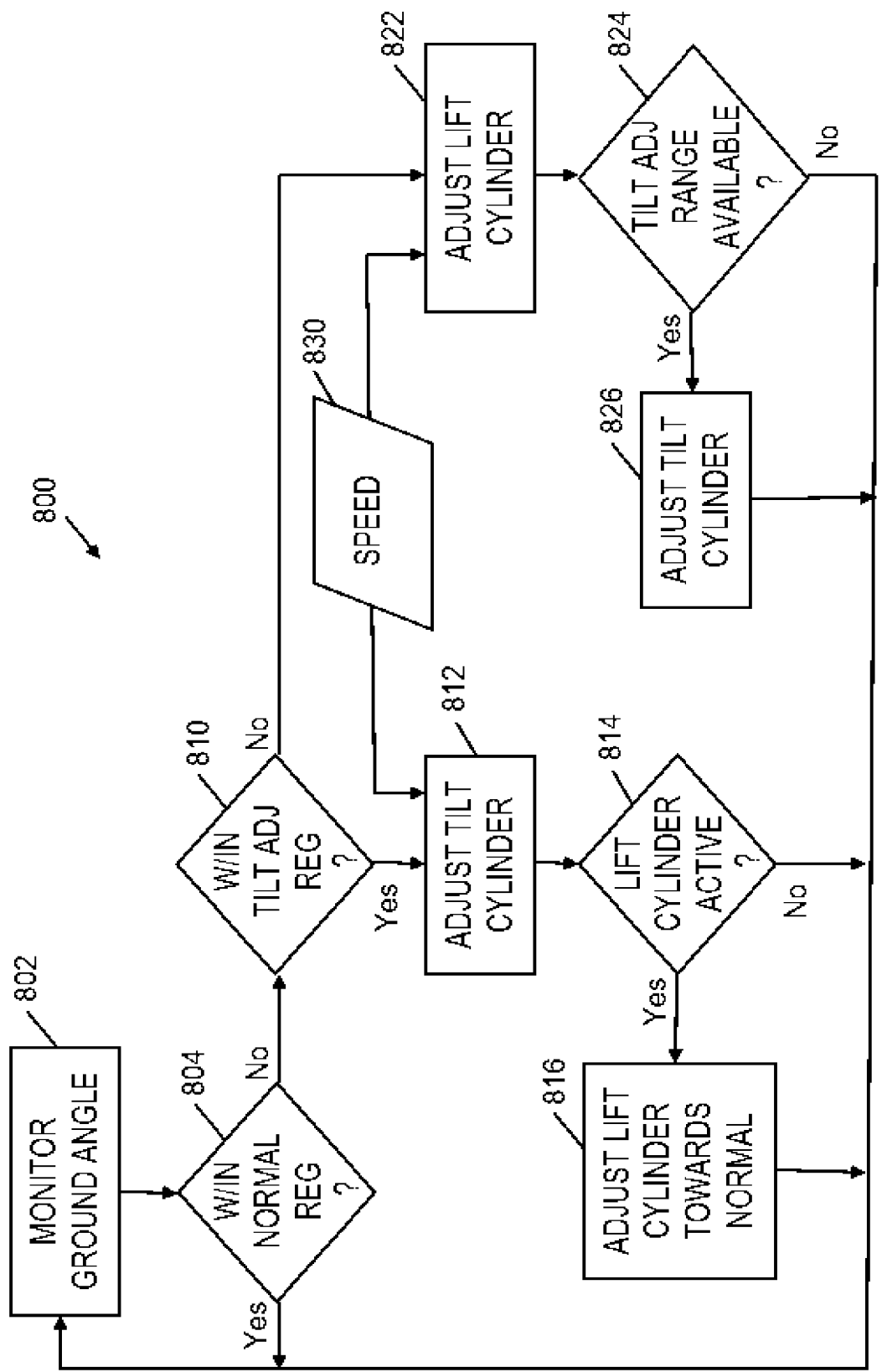
FIG. 8 illustrates an exemplary control diagram for sending commands to the tilt and lift/float cylinders based on readings from the ground contour sensing system.

FIG. 8 illustrates an exemplary control diagram 800 for sending commands to the tilt and lift/float cylinders 610, 620, 630 based on ground angle readings from the ground contour sensing system 420. A similar control flow can be used with the sensing system 520 and other ground contour sensing systems. Based upon characteristics of the mowing head 400, positioning of the ground contour sensing system 420 relative to the mowing head 400, and other factors, a user can determine the desired tilt and lift thresholds for the system that can be used as described below.

At block 802, the controller 600 monitors the ground angle readings from the contour sensing system 420. When the coulter blade 438 is moving along fairly smooth and level ground, the angle of the pivot arm 436 stays relatively steady and the angle readings remain in the normal range 702 between the upper and lower tilt thresholds. Angle readings in the normal range indicate relatively smooth and level ground that does not require tilting or lifting of the mower head 400. Thus, the mowing head 400 can stay at a normal position floating a desired distance above the ground 450. At block 804, the controller 600 checks whether the current ground angle reading is in the normal range 702. If the current ground angle reading is in the normal range 702, then control returns to block 802 and the mowing head 400 is not moved, otherwise control passes to block 810.

At block 810, the controller 600 checks whether the current ground angle reading is in the upper tilt adjustment region 710 between the upper tilt and lift thresholds, or in the lower tilt adjustment region 712 between the lower tilt and lift thresholds. If the current angle reading is in one of the upper or lower tilt adjustment regions 710, 712, then control passes to block 812. When the current ground angle reading is greater than the upper lift threshold it is in the upper lift/float adjustment region 720, and when the current angle reading is less than the lower lift threshold it is in a lower lift/float adjustment region 722. If the current ground angle reading is in one of the upper or lower lift/float adjustment regions 720, 722, then control passes to block 822.

At block 812, the controller 600 sends commands to the tilt cylinder 610 to adjust for the upcoming change in ground contour. Block 812 also receives a speed input from block 830 which indicates the speed at which the mowing head 400 is moving forward. When the coulter blade 438 starts rolling up or down a hill or hits debris the angle of the pivot arm 436 changes. For example, when the coulter blade 438 starts rolling up the bump 454 as shown in FIG. 4, the pivot arm 436 is pushed back towards the mowing head 400 which changes the readings of the angle sensor 434 which indicates that the mowing head 400 is approaching an uphill ground contour. As another example, when the pivot arm 536 starts going down the gully 554 as shown in FIG. 5, the pivot arm 536 moves forward away from the mowing head 500 which changes the readings of the angle sensor 534 and indicates that the mowing head 500 is approaching a downhill ground contour. When the readings of the angle sensor 434 are in one of the upper or lower tilt adjustment regions 710, 712, the controller 600 can send commands to the tilt cylinder 610 to tilt the mowing head 400 in the appropriate direction and/or by the appropriate magnitude indicated by the ground angle readings. For example, in the situation illustrated in FIG. 4, the controller 600 can command the tilt cylinder 610 to tilt up the front of the mowing head 400 based on the speed of the mowing head 400 and the difference between the current ground angle readings of the angle sensor 434 and the upper tilt threshold. For example, in the situation illustrated in FIG. 5, the controller 600 can command the tilt cylinder 610 to tilt down the front of the mowing head 500 based on the speed of the mowing head 500 and the difference between the current ground angle readings of the angle sensor 534 and the lower tilt threshold. Faster speeds may require a greater change in tilt angle, or may lower the magnitude of the angle of the upper and lower tilt and lift thresholds.

Control passes from block 812 to block 814. At block 814, the controller 600 checks whether lift/float cylinders 620, 630 are active or not in their normal or default positions for level mowing. When the ground angle readings are within the tilt adjustment region (between the upper and lower lift thresholds) as they are at this point, it may be desirable to move the lift/float cylinders 620, 630 back to their normal positions and just use the tilt cylinder 610 for ground contour adjustment. If the lift/float cylinders 620, 630 are not active, then control returns to block 802 to get further ground angle readings. If the lift/float cylinders 620, 630 are active, then control passes to block 816 where the lift/float cylinders 620, 630 are adjusted back towards their normal positions, and then control returns to block 802 to get further ground angle readings.

At block 822, the controller 600 sends commands to the lift/float cylinders 620, 630 to adjust for the upcoming change in ground contour. Block 822 also receives a speed input from block 830 which indicates the speed at which the mowing head 400 is moving forward. A PID (proportional-integral-derivative) control loop can be used to process the ground angle and speed inputs to calculate the magnitude and rate of change for the commands to the lift/float cylinders 620, 630. When the coulter blade 438 starts rolling up or down a steeper hill or hits more severe debris the angle of the pivot arm 436 changes more rapidly and by a greater amount. For example, if the bump 454 shown in FIG. 4 is steeper, the coulter blade 438 moves the pivot arm 436 more rapidly towards the mowing head 400 which changes the readings of the angle sensor 434 faster which indicates that the mowing head 400 is approaching a steep uphill ground contour. As another example, if the gully 554 shown in FIG. 5 has steeper banks, when the pivot arm 536 starts going down the gully 554, the pivot arm 536 moves forward faster and may swing against the stop 540 which changes the readings of the angle sensor 534 faster and indicates that the mowing head 500 is approaching a steep downhill ground contour. When the readings of the angle sensor 434 are in one of the upper or lower lift/float adjustment regions 720, 722, the controller 600 can send commands to the lift/float cylinders 620, 630 to lift the mowing head 400 in the appropriate direction and/or by the appropriate magnitude indicated by the angle readings. For example, in the situation illustrated in FIG. 4, the controller 600 can command the lift/float cylinders 620, 630 to raise the mowing head 400 based on the speed of the mowing head 400 and the difference between the current ground angle readings of the angle sensor 434 and the upper lift threshold. If the mowing head 400 has ground contour sensing systems 420 and lift/float cylinders 620, 630 on both the left and right sides, then the controller 600 can command the left and right lift/float cylinders 620, 630 independently based on the angle readings from the ground contour sensing system 420 on the same side. Faster speeds may require a greater lift of the mowing head 400, or may lower the magnitude of the angle of the upper and lower lift thresholds.

Control passes from block 822 to block 824. At block 824, the controller 600 checks whether the tilt cylinder(s) 610 still have adjustment range available. The tilt cylinder 610 can continue to tilt the mowing head 400 in the appropriate direction even when the ground angle readings are in the upper or lower lift/float adjustment regions 720, 722. If the tilt cylinder(s) 610 do not have adjustment range available, then control returns to block 802 to get further ground angle readings. If the tilt cylinder(s) 610 still have adjustment range available, then control passes to block 816 where the tilt cylinder(s) 610 are adjusted in the appropriate direction, and then control returns to block 802 to get further ground angle readings.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A ground contour sensing system for a vehicle with a mowing head that moves across the ground, the mowing head having a front, a rear, and a tilt cylinder configured to tilt the front of the mowing head relative to the rear of the mowing head, the ground contour sensing system comprising:
   a first sensor system configured to measure a first ground contour of the ground in front of the mowing head, and to generate first contour measurement signals, where the first contour measurement signals are in a range that comprises a normal region between an upper tilt threshold and a lower tilt threshold, an upper tilt adjustment region between the upper tilt threshold and an upper lift threshold, and a lower tilt adjustment region between the lower tilt threshold and a lower lift threshold;
   a controller configured to receive the first contour measurement signals, and to determine whether to move the mowing head based on the first contour measurement signals;
   wherein the first sensor system comprises a first connection arm and a first angle sensor, where the first connection arm has a proximal end coupled to the mowing head and a distal end that extends forward beyond the front of the mowing head, and the first angle sensor is coupled to the distal end of the first connection arm such that the first angle sensor is forward beyond the front of the mowing head and the first angle sensor is configured to generate the first contour measurement signals; and
   wherein when the first contour measurement signals are greater than the upper tilt threshold the controller is configured to generate and send movement commands to the tilt cylinder to raise the front of the mowing head relative to the rear of the mowing head, and when the first contour measurement signals are less than the lower tilt threshold the controller is configured to generate and send movement commands to the tilt cylinder to lower the front of the mowing head relative to the rear of the mowing head.

2. The ground contour sensing system of claim 1, wherein the mowing head further includes a lift cylinder configured to raise and lower the mowing head relative to the ground; and
   wherein when the first contour measurement signals are greater than the upper lift threshold the controller is configured to generate and send movement commands to the lift cylinder to raise the mowing head relative to the ground, and when the first contour measurement signals are less than the lower lift threshold the controller is configured to generate and send movement commands to the lift cylinder to lower the mowing head relative to the ground.

3. The ground contour sensing system of claim 2, wherein the first sensor system comprises:
   a pivot arm with a proximal end and a distal end, the proximal end of the pivot arm coupled to the first angle sensor and the distal end configured to move in response to changes in the first ground contour in front of the mowing head;
   wherein the first angle sensor is configured to measure an angle of the pivot arm, and the first contour measurement signals are ground angle readings generated by the first angle sensor based on movement of the pivot arm.

4. The ground contour sensing system of claim 3, wherein the first sensor system further comprises:
   a coulter blade coupled to the distal end of the pivot arm, the coulter blade configured to travel along the ground in front of the mowing head.

5. The ground contour sensing system of claim 3, wherein the distal end of the pivot arm is configured to travel along the ground in front of the mowing head.

6. The ground contour sensing system of claim 3, wherein the first sensor system further comprises:
   a stop configured to prevent movement of the proximal end of the first pivot arm beyond the stop; and
   wherein the proximal end of the pivot arm is biased towards the stop.

7. The ground contour sensing system of claim 3, wherein the mowing head extends laterally between a right side and a left side; and the first sensor system is positioned near the center between the right and left sides of the mowing head.

8. The ground contour sensing system of claim 1, wherein the mowing head extends laterally between a right side and a left side; and the first sensor system is positioned near the left side of the mowing head and is configured to measure the first ground contour of the ground in front of the left side of the mowing head; and wherein the ground contour sensing system further comprises:
   a second sensor system positioned near the right side of the mowing head and configured to measure a second ground contour of the ground in front of the right side of the mowing head, and generate second contour measurement signals, where the second contour measurement signals are in the range that comprises the normal region between the upper tilt threshold and lower tilt thresholds, the upper tilt adjustment region between the upper tilt threshold and the upper lift threshold, and the lower tilt adjustment region between the lower tilt threshold and the lower lift threshold;

wherein the controller is configured to receive the first and second contour measurement signals, and to determine whether to move the mowing head based on the first and second contour measurement signals;

wherein the second sensor system comprises a second connection arm and a second angle sensor, where the second connection arm has a proximal end coupled to the mowing head and a distal end that extends forward beyond the front of the mowing head, and the second angle sensor is coupled to the distal end of the second connection arm such that the second angle sensor is forward beyond the front of the mowing head and the second angle sensor is configured to generate the second contour measurement signals; and wherein when the second contour measurement signals are greater than the upper tilt threshold the controller is configured to generate and send movement commands to the tilt cylinder to raise the front of the mowing head relative to the rear of the mowing head, and when the second contour measurement signals are less than the lower tilt threshold the controller is configured to generate and send movement commands to the tilt cylinder to lower the front of the mowing head relative to the rear of the mowing head.

9. The ground contour sensing system of claim 8, wherein the mowing head includes a right lift cylinder configured to raise and lower the right side of the mowing head relative to the left side of the mowing head; and a left lift cylinder configured to raise and lower the left side of the mowing head relative to the right side of the mowing head; and wherein the controller is configured to determine whether to move the mowing head using one or more of the tilt and left and right lift cylinders based on the first and second contour measurement signals, and to generate and send movement commands to the tilt and left and right lift cylinders when it determines to move the mowing head using the tilt and left and right lift cylinders based on the first and second contour measurement signals.

10. The ground contour sensing system of claim 9, wherein when the first contour measurement signals are greater than the upper lift threshold the controller is configured to generate and send movement commands to the left lift cylinder to lift the left side of the mowing head, and when the first contour measurement signals are less than the lower lift threshold the controller is configured to generate and send movement commands to the left lift cylinder to lower the left side of the mowing head; and wherein when the second contour measurement signals are greater than the upper lift threshold the controller is configured to generate and send movement commands to the right lift cylinder to lift the right side of the mowing head, and when the second contour measurement signals are less than the lower lift threshold the controller is configured to generate and send movement commands to the right lift cylinder to lower the right side of the mowing head.

11. The ground contour sensing system of claim 9, wherein the first sensor system comprises a first pivot arm with a proximal end and a distal end, the proximal end of the first pivot arm coupled to the first angle sensor and the distal end configured to move in response to changes in the first ground contour in front of the mowing head, and wherein the first angle sensor is configured to measure an angle of the first pivot arm, and the first contour measurement signals are ground angle readings generated by the first angle sensor based on movement of the first pivot arm; and wherein the second sensor system comprises a second pivot arm with a proximal end and a distal end, the proximal end of the second pivot arm coupled to the second angle sensor and the distal end configured to move in response to changes in the second ground contour in front of the mowing head, and wherein the second angle sensor is configured to measure an angle of the second pivot arm, and the second contour measurement signals are ground angle readings generated by the second angle sensor based on movement of the second pivot arm.

12. A ground contour sensing method for a vehicle with a mowing head that moves across the ground, the mowing head having a front, a rear, and a tilt cylinder configured to tilt the front of the mowing head relative to the rear of the mowing head, the ground contour sensing method comprising:

detecting a ground contour of the ground in front of the mowing head using a sensor system positioned forward beyond the front of the mowing head;

generating contour measurement signals based on the detected ground contour, the contour measurement signals falling in a range comprising a normal region between an upper tilt threshold and a lower tilt threshold, an upper tilt adjustment region between the upper tilt threshold and an upper lift threshold, and a lower tilt adjustment region between the lower tilt threshold and a lower lift threshold;

determining whether to move the mowing head based on the contour measurement signals;

when the contour measurement signals are greater than the upper tilt threshold, generating and sending movement commands to the tilt cylinder to raise the front of the mowing head relative to the rear of the mowing head; and when the contour measurement signals are less than the lower tilt threshold, generating and sending movement commands to the tilt cylinder to lower the front of the mowing head relative to the rear of the mowing head.

13. The ground contour sensing method of claim 12, wherein the mowing head includes a lift cylinder configured to raise and lower the mowing head relative to the ground; and the method further comprising:

when the contour measurement signals are greater than the upper lift threshold, generating and sending movement commands to the lift cylinder to raise the mowing head relative to the ground; and when the contour measurement signals are less than the lower lift threshold, generating and sending movement commands to the lift cylinder to lower the mowing head relative to the ground.

14. The ground contour sensing method of claim 13, wherein the sensor system comprises a pivot arm and an angle sensor positioned forward beyond the front of the mowing head, the pivot arm having a proximal end and a distal end, the distal end configured to move in response to changes in the ground contour in front of the mowing head, and the angle sensor is coupled to the proximal end of the pivot arm; and wherein detecting a ground contour of the ground in front of the mowing head comprises measuring an angle of the pivot arm using the angle sensor; and wherein generating contour measurement signals based on the detected ground contour comprises generating ground angle signals based on the measured angle of the pivot arm using the angle sensor.

15. The ground contour sensing method of claim 13, further comprising:

monitoring speed of the tractor; and wherein generating and sending movement commands to the tilt or lift cylinder comprises generating movement commands based on the monitored speed of the tractor.

16. The ground contour sensing method of claim 12, wherein the sensor system comprises:

a connection arm having a proximal end coupled to the mowing head and a distal end that extends forward beyond the front of the mowing head; and an angle sensor coupled to the distal end of the connection arm such that the angle sensor is forward beyond the front of the mowing head, the angle sensor configured to generate the contour measurement signals.

17. The ground contour sensing method of claim 16, wherein the sensor system further comprises:

a pivot arm with a proximal end and a distal end, the proximal end of the pivot arm coupled to the angle sensor and the distal end of the pivot arm configured to move in response to changes in the ground contour in front of the mowing head;

wherein the angle sensor is configured to measure an angle of the pivot arm, and the contour measurement signals are ground angle readings generated by the angle sensor based on movement of the pivot arm.

\* \* \* \* \*